April 25, 1933. A. L. McCALLUM ET AL 1,905,930
METHOD OF PREPARING CALCIUM NITRATE FROM PHOSPHATE ROCK
Filed July 30, 1931
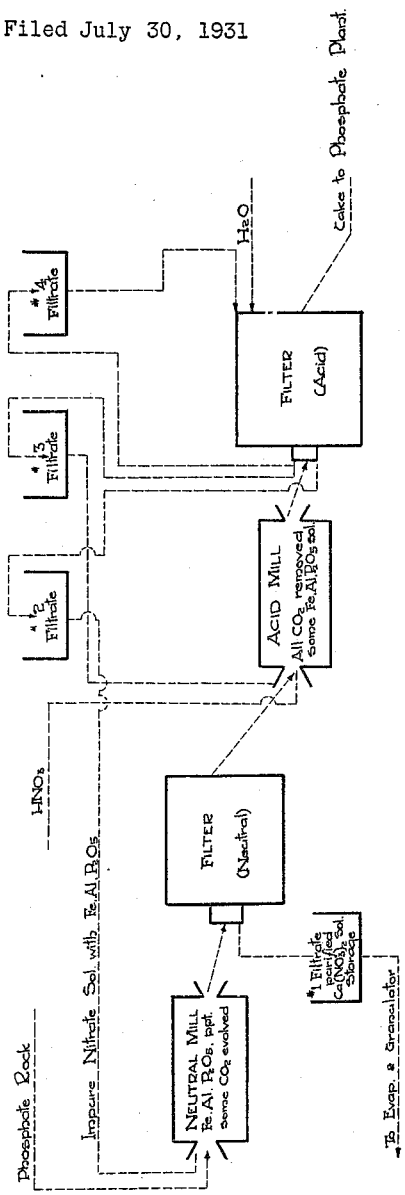

Patented Apr. 25, 1933

1,905,930

UNITED STATES PATENT OFFICE

ARTHUR LIONEL McCALLUM, BRIAN PORTER SUTHERLAND, AND JOSHUA BEAUMONT THOMPSON, OF TRAIL, BRITISH COLUMBIA, CANADA, ASSIGNORS TO THE CONSOLIDATED MINING AND SMELTING COMPANY OF CANADA, LIMITED, OF MONTREAL, CANADA, A CORPORATION OF CANADA

METHOD OF PREPARING CALCIUM NITRATE FROM PHOSPHATE ROCK

Application filed July 30, 1931. Serial No. 553,924.

Our invention relates to a method of beneficiating phosphate rock, containing impure calcareous material, for the preparation of a highly purified solution of calcium nitrate simultaneously with its treatment for the preparation of phosphate or phosphoric compounds, and is characterized by the step of dissolving the calcareous material with an excess of nitric acid and purifying the filtrate of the resulting acid solution by neutralizing it with an excess of fresh phosphate rock.

The preparation of calcium nitrate by treating substantially pure calcareous material with nitric acid is generally known, and the preparation of that substance on a commercial scale from that source presents no chemical or physical difficulties which cannot be readily overcome. The beneficiation of low grade phosphate rock, however, has heretofore been deemed an economic impossibility owing to the low phosphate content and the presence of impurities in the raw material, and it is to the beneficiation of this material for the preparation of calcium nitrate and phosphate or phosphoric compounds that our present invention is more particularly directed, the object being to devise a cyclic method of lixiviation by which the rock can be treated for the preparation of a highly purified neutralized solution of calcium nitrate concurrently with its treatment for the preparation of the phosphate or phosphoric compounds.

According to this method of lixiviation, the calcareous material is dissolved with an excess of nitric acid, the solids are separated from the acid solution and removed from the cycle of lixiviation to be treated for the preparation of the phosphate or phosphoric compounds, the filtrate of the acid solution is purified by neutralizing it with an excess of fresh phosphate rock, the filtrate of the neutralized and purified solution is removed from the cycle of lixiviation, and the cycle is restarted by treating the solids, separated from the neutralized solution, with the excess of nitric acid.

The method is shown diagrammatically in the accompanying drawing of the flow sheet and the description of the sequence of steps may start either with the introduction of the excess of nitric acid into the circuit for dissolving the calcareous material of the charge and preparing the impure acid solution, or with the introduction of the excess of fresh phosphate rock for neutralizing and purifying it. At the latter step of the method the fresh phosphate rock is ground in the "neutral mill" where it is met with the filtrate of the acid solution from the previous step. This acid filtrate contains the soluble impurities present in the rock treated and these impurities are precipitated by the neutralization of the solution with an excess of the rock. When the neutralization is complete the slurry from the "neutral mill" is transferred to the "neutral filter" which separates the solids and the neutralized filtrate, and this filtrate is the purified solution of calcium nitrate. The neutralized filtrate then passes out of the cycle of lixiviation to the "purified filtrate storage," or number 1 filtrate tank, from which it is taken to the evaporator and granulator.

The solids separated from the neutralized filtrate are transferred to the "acid mill" and reground, and during the re-grinding they are treated with an excess of nitric acid which dissolves all of the calcareous material and part of the soluble impurities such as iron, aluminum and phosphate compounds. The carbon dioxide is removed from the "acid mill" and the slurry is transferred to the "acid filter" and is there diluted with water or with a portion of the acid filtrate. The "acid filter" separates the solids from the liquid of the slurry and these solids in the form of filter cake pass out of the cycle of lixiviation to be treated for the preparation of phosphate or phosphoric compounds or other products. The filtrate from the "acid filter" is the impure acid solution of calcium nitrate to be purified and this filtrate passes to "filtrate" storage tank 2, or part of the filtrate may pass to storage tank 2 and the remainder may pass to "filtrate" storage tanks 3 and 4. From "filtrate" storage tank 4 the filtrate recirculates through the "acid filter" and from "filtrate" storage tank 3 the filtrate recirculates through the "acid mill". From "filtrate" storage tank 2 the acid filtrate circulates to the "neutral mill" where it is neutralized with an excess of fresh phosphate rock. The filtrate from the "acid filter" contains the soluble impurities present in the rock and these impurities are precipitated in the "neutral mill" solely by neutralization with the excess of fresh phosphate rock. When the filtrate is separated from the solids by the "neutral filter" this filtrate is in a highly purified state and, after evaporating and drying in any well known manner, is ready to market as a high grade calcium nitrate salt.

Specifically, 1,000 grams of low grade phosphate rock containing as a diluent free calcium carbonate in substantial quantities, is ground to 150 mesh, treated with 1,780 c. c. of water and 470 c. c. nitric acid, or about twice as much as is needed to react with the carbonate in the rock. The sludge is ground in the "acid mill" until the rock is free of carbonate. The slurry so obtained is filtered. 1,200 c. c. of the acid filtrate is treated in the ball mill with 800 grams of fresh phosphate rock, being about 200 grams in excess of the amount of rock required to neutralize the acid and mono-basic phosphate in solution. The filtrate from the "neutral mill" is then filtered and evaporated to dryness, whereupon the salt so obtained is found to contain nitrogen (N) in the form of calcium nitrate 15.6%, phosphorus pentoxide ($P_2O_5$) .02%, alumina ($Al_2O_3$) .2% and ferric oxide ($Fe_2O_3$) nil.

Having thus fully described our invention, what we claim as new and desire to secure by Letters Patent is:

1. A method of preparing a solution of calcium nitrate, substantially free from impurities, in the beneficiation of phosphate rock containing impure calcareous material, which comprises preparing an acid solution of the calcareous material, purifying the acid solution by neutralizing it with an excess of the fresh rock, separating the purified solution from the solids, and treating said solids with an excess of nitric acid for the preparation of the acid solution.

2. A method of preparing a solution of calcium nitrate, substantially free from impurities, in the lixiviation of phosphate rock containing impure calcareous material, which comprises preparing an acid solution of the calcareous material, purifying the acid solution by neutralizing it with an excess of the fresh rock, separating the purified solution from the solids, removing the purified solution from the cycle of lixiviation, treating said solids with an excess of nitric acid for the preparation of the acid solution, retaining the acid solution in the cycle of lixiviation, and removing therefrom the solids separated from the acid solution.

3. A method of preparing a solution of calcium nitrate, substantially free from impurities, in the lixiviation of phosphate rock containing impure calcareous material, which comprises preparing an acid solution of the calcareous material, purifying the acid solution by neutralizing it with an excess of fresh phosphate rock, separating the purified solution and solids, removing the purified solution from the cycle of lixiviation, treating the solids separated from the purified solution with an excess of nitric acid for the preparation of the acid solution, separating the solids from the acid solution, retaining the acid solution in the cycle of lixiviation and removing therefrom the solids separated from said acid solution.

4. A method of preparing a solution of calcium nitrate, substantially free from impurities, in the lixiviation of phosphate rock containing impure calcareous material, which comprises treating the calcareous material and the soluble impurities with an excess of nitric acid, separating the resulting acid solution from the solids by filtration, removing said solids from the cycle of lixiviation, purifying the acid solution by neutralizing it with an excess of fresh phosphate rock, separating the solids by filtration from the purified solution, removing the purified solution from the cycle of lixiviation, and transferring the solids separated from the purified solution to that step of the lixiviation where they are treated with an excess of nitric acid for the preparation of the impure acid solution.

5. A method of preparing calcium nitrate, substantially free from impurities, in the beneficiation of phosphate rock containing impure calcareous material which comprises the step of treating the calcareous material with an excess of nitric acid, and precipitating the impurities contained in the acid solution by neutralizing it with an excess of fresh phosphate rock.

6. A method of preparing a solution of calcium nitrate, substantially free from impurities, in the beneficiation of phosphate rock containing impure calcareous material, which comprises the step of preparing an acid solution of a calcareous material, precipitating the impurities contained in the acid solution by neutralizing it with an excess of phosphate rock, separating the purified solution from the solids, and treating said solids with an excess of nitric acid for the preparation of the acid solution.

7. A method of preparing a solution of calcium nitrate, substantially free from impurities, in the lixiviation of phosphate rock containing impure calcareous materials which comprises the step of preparing an acid solution of the calcareous material, precipitating the impurities contained in the acid solution by neutralizing it with an excess of fresh phosphate rock, separating the purified solution from the solids, removing the purified solution from the cycle of lixiviation, treating said solids with an excess of nitric acid for the preparation of the acid solution, retaining the acid solution in the cycle of lixiviation, and removing therefrom the solids separated from the acid solution.

8. A method of preparing a solution of calcium nitrate, substantially free from impurities, in the lixiviation of phosphate rock containing impure calcareous materials, which comprises treating the calcareous material and the soluble impurities with an excess of nitric acid, separating the resulting acid solution from the solids by filtration, removing said solids from the cycle of lixiviation, precipitating the impurities contained in the acid solution by neutralizing it with an excess of fresh phosphate rock, separating the solids, by filtration, from the purified solution, removing the purified solution from the cycle of lixiviation, and transferring the solids separated from the purified solution to that step of lixiviation where they are treated with an excess of nitric acid for the preparation of the impure acid solution.

Signed at the city of Trail, in the District of West Kootenay and Province of British Columbia, Canada, this 30th day of June, A. D. 1931.

ARTHUR LIONEL McCALLUM.
BRIAN PORTER SUTHERLAND.
JOSHUA BEAUMONT THOMPSON.